United States Patent Office 3,331,165
Patented July 18, 1967

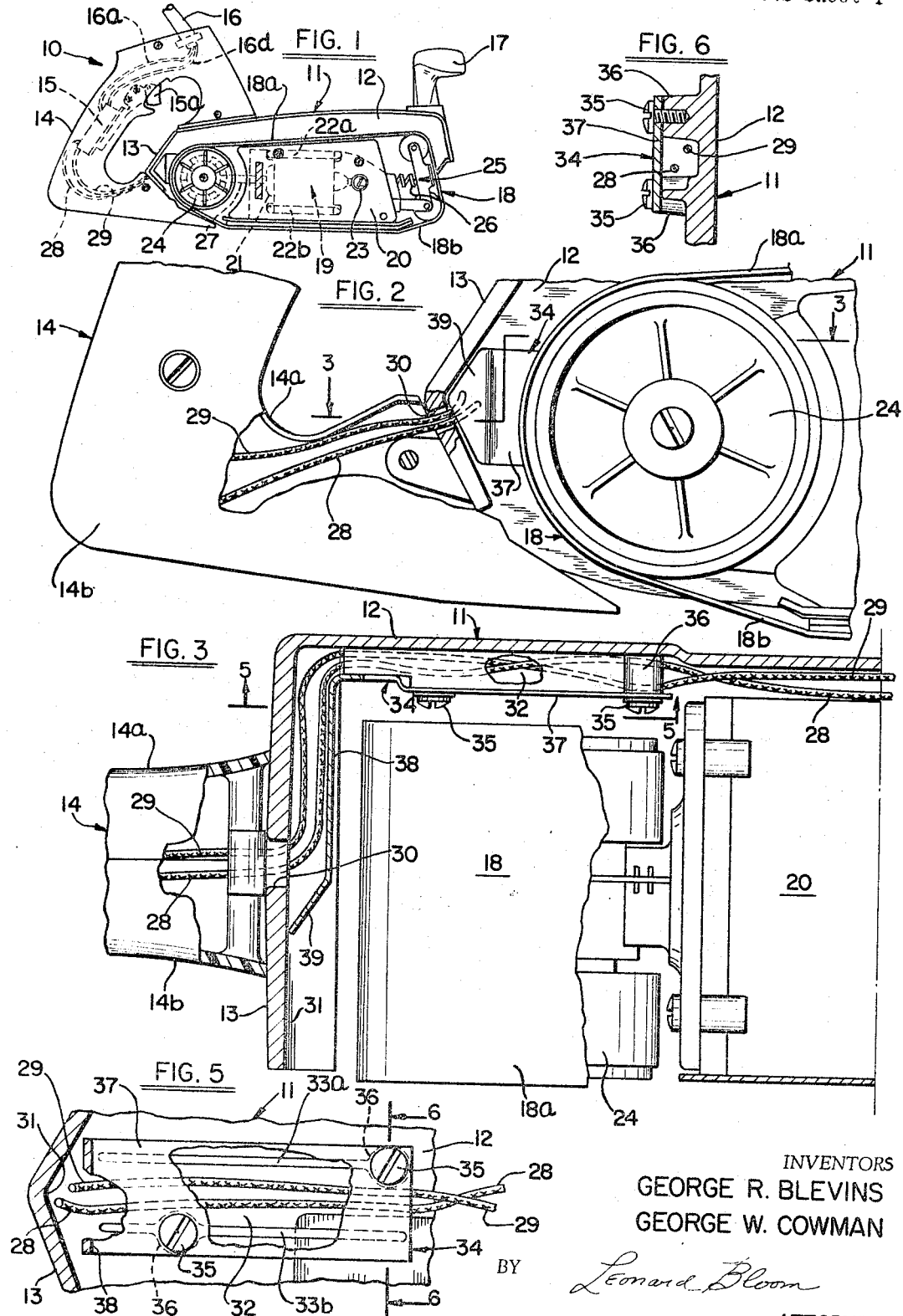

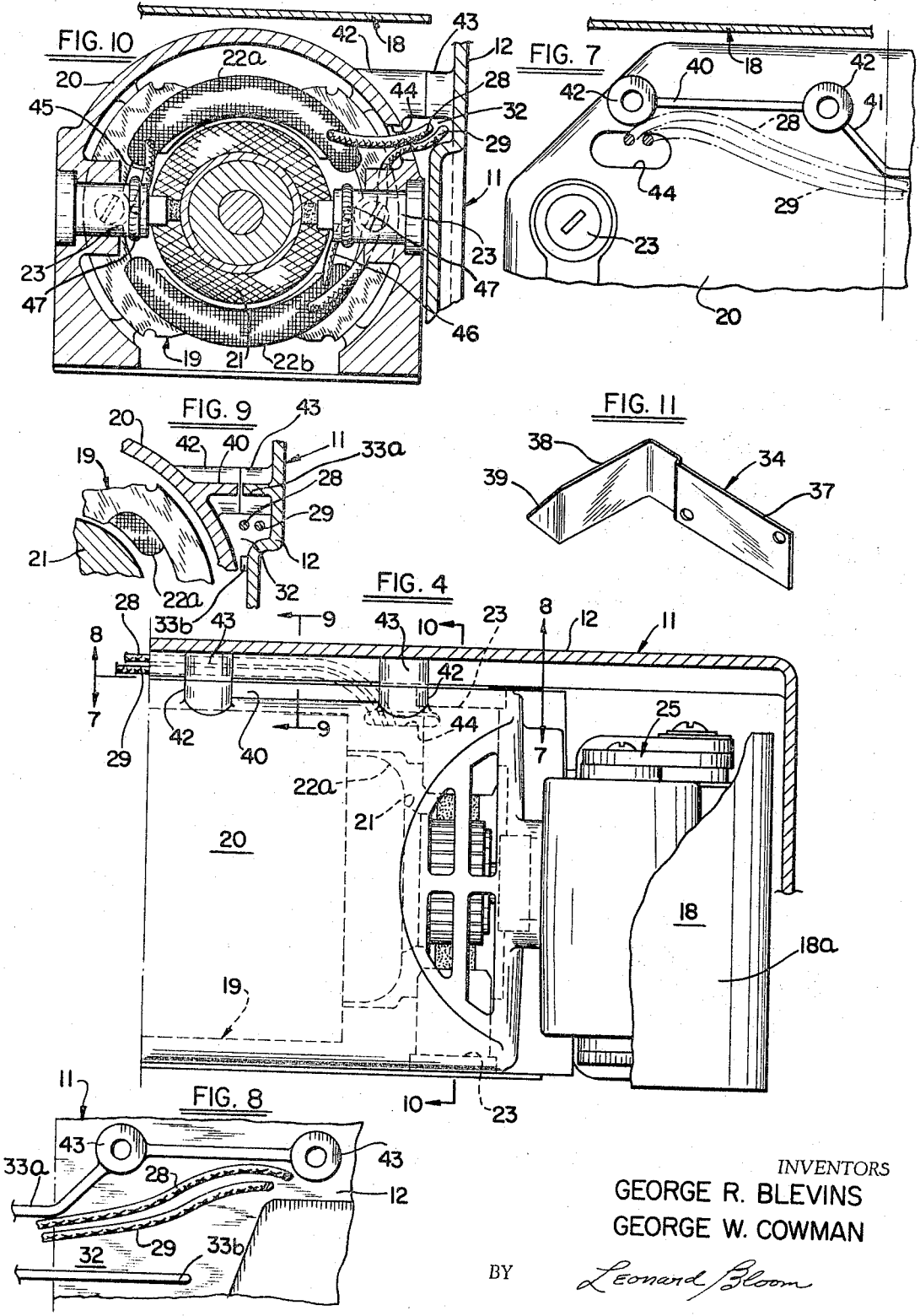

3,331,165
ELECTRICAL CONNECTION MEANS FOR COMPACT BELT SANDER
George R. Blevins and George W. Cowman, Baltimore, Md., assignors to The Black and Decker Manufacturing Company, Towson, Md., a corporation of Maryland
Filed May 4, 1965, Ser. No. 453,101
6 Claims. (Cl. 51—170)

The present invention relates to an electrical connection means for a belt sander, and more particularly, to a means for protecting the electrical leads in a compact belt sander in which the driving motor is disposed directly within the endless belt.

It is an object of the present invention to provide a reliable and economical electrical connection means for the driving motor which is within the belt, and especially to prevent the electrical leads from ever coming into contact with the belt.

The present invention finds particular utility in a compact belt sander which generally comprises a housing formed with side and end wall portions, an end handle secured rearwardly of the end wall, a switch in the handle with an electrical line cord connected thereto, an endless belt within the housing laterally of the side wall and forwardly of the end wall of the housing, the belt having upper and lower runs, and a motor within the runs of the belt and drivingly coupled to the belt.

The present invention constitutes an improvement in the electrical connection means for the compact belt sander; and this improvement includes a pair of leads in the end handle, at least one of the leads connected to the switch. The end wall of the housing has an opening therein, and the leads project through the opening and run along the end wall towards the side wall of the housing, thence along the side wall, longitudinally of the belt sander and intermediately of the upper and lower runs of the belt, with the forwardmost ends of the leads being connected to the motor which is within the belt. Means are provided to confine the leads within the housing and to protect the leads from the belt. This last-named means includes a cover member which is secured to one of the wall portions of the housing, and the cover member has a portion thereof overlying the opening in the end wall of the housing.

In accordance with the further teachings of the present invention, the portion of the cover member overlying the opening in the end wall of the housing has a degree of inherent resiliency and tends to spring back towards the end wall of the housing so as to maintain the opening substantially covered, thereby closely confining the leads and preventing the leads from coming into contact with the belt.

In accordance with the specific teachings of the present invention, channel-shaped dwells are formed in the respective side and end wall portions of the housing. The dwell in the end wall of the housing communicates with the opening therein; and the dwells communicate with one another, with the leads being received within the dwells. The cover member in turn comprises a relatively-thin right-angularly bent member which is provided with respective leg portions, one of which covers the opening and the respective dwell in the end wall of the housing, and the other of which covers at least a portion of the respective dwell in the side wall of the housing. The respective dwell in the side wall of the housing is formed by substantially parallel ribs intermediately of the upper and lower runs of the belt, with the remaining portion of the dwell in the side wall (forwardly of the respective leg of the cover member) being substantially enclosed by the motor frame. The motor frame in turn has an opening therein to receive the forwardmost ends of the leads therethrough, with the leads being disposed within the motor frame and being connected therein to the motor.

In accordance with another aspect of the present invention, the motor is of the universal type, and includes respective field coils and commutator-engaging brushes connected in series with the field coils. The motor has an axis which is disposed longitudinally of the belt sander; and the brushes are mounted transversely of the longitudinal motor axis, and preferably are disposed in the forward portion of the motor frame. The extremities of the leads are received through the opening in the motor frame in proximity to the brushes, and at least one of the leads is connected directly to one of the series field coils of the motor.

These and other objects of the present invention will become apparent from a reading of the following specification, taken in conjunction with the enclosed drawings, in which:

FIGURE 1 is a side elevation of an embodiment of a compact belt sander, one in which the motor is disposed directly within the belt, and incorporating the preferred teachings of the present invention;

FIGURE 2 is an enlarged fragmentary portion of FIGURE 1, showing the manner in which the electrical leads in the end handle of the tool are received through an opening formed in the end wall of the housing;

FIGURE 3 is a sectional view, taken along the lines 3—3 of FIGURE 2, showing the communicating respective dwells formed in the end and side wall portions of the housing, with the leads passing through the opening in the end wall and being received within the communicating respective dwells, and further showing the cover member secured to the side wall of the housing and substantially covering the leads within the respective dwells;

FIGURE 4 is a plan view of the forwardmost portion of the housing, with parts broken away and sectioned, and showing the manner in which the continuation of the leads of FIGURE 3 are retained between the motor frame and the dwell in the side wall of the housing, with the leads passing through an opening formed in the motor frame;

FIGURE 5 is a section view, taken along the lines 5—5 of FIGURE 3, and illustrating the enclosure of the leads in one of the respective dwells by means of the cover member;

FIGURE 6 is a section view, taken along the lines 6—6 of FIGURE 5, and further illustrating the enclosing function of the cover member;

FIGURE 7 is a view taken along the lines 7—7 of FIGURE 4, showing the manner in which the forward continuations of the leads are received through the opening in the motor frame, the leads being illustrated in phantom by means of the broken lines;

FIGURE 8 is a section view, taken along the lines 8—8 of FIGURE 4, showing the continuation of the parallel ribs in the side wall to form the respective dwell for the leads;

FIGURE 9 is a section view, taken along the lines 9—9 of FIGURE 4, and showing the manner in which the leads are retained between the ribbed wall of the motor frame and the respective dwell formed in the side wall of the housing;

FIGURE 10 is a view taken along the lines 10—10 of FIGURE 4, showing the brushes and field coils mounted in the motor frame, and further showing the connection of the leads to the coils of the series field motor; and FIGURE 11 is a perspective of the cover member utilized in accordance with the teachings of the present invention.

With reference to FIGURE 1, there is illustrated a preferred embodiment of a compact belt sander 10 within which the teachings of the present invention may be incorporated. The belt sander 10 generally comprises a housing 11 formed with a side wall portion 12 and an end wall portion 13, an end handle 14 secured rearwardly of the housing, a switch 15 with a trigger portion 15a to control the energization of the belt sander through an electrical line cord 16, a front handle 17 to assist in the manipulation and the control of the unit, an endless belt 18 within the housing, the belt being disposed forwardly of the end wall 13 and laterally of the side wall 12, and the belt having an upper "run" 18a and a lower "run" 18b, a motor 19 in a frame 20 disposed directly within the belt between the upper and lower runs thereof, the motor preferably being disposed along a longitudinal axis and having an armature 21, respective series field coils 22a and 22b, and commutator-engaging brushes 23, a driving pulley 24 at one end of the belt, a guiding pulley means 25 at the opposite end of the belt, the guiding pulley means being tensioned by a spring 26 seated on the front portion of the motor frame, and a suitable gearing means 27 drivingly interconnecting the motor with the driving pulley.

With reference again to FIGURE 1, the electrical line cord 16 is received within the end handle 14 and has respective portions 16a and 16d connected to the switch body 15; preferably, the switch 15 is of the double-pole type, but could be of the single-pole type, if desired. A pair of leads 28 and 29 are in turn connected from the opposite end of the switch 15 and are received within the lowermost portion of the end handle 14.

With further reference to FIGURES 2, 3, 5, and 6, the end handle is preferably, but not necessarily, molded from a suitable plastic and is longitudinally split into complementary mating halves 14a and 14b with the leads 28 and 29 being received therebetween. The leads 28 and 29 pass through an opening 30 formed within the end wall 13 of the housing. This end wall 13 has a dwell 31 formed therein which communicates with a dwell 32 formed in the side wall 12 of the housing. In the preferred embodiment, the dwell 31 in the end wall 13 is formed by means of inclining the respective portions of the end wall 13 to form a pocket therein, while the respective dwell 32 in the side wall 12 is formed between substantially-parallel ribs 33a and 33b as shown in FIGURE 5. These ribs 33a and 33b are preferably cast integrally with the side wall 12. The electrical leads 28 and 29 after passing through the opening 30, see FIGURE 3 again, run along the dwell 31 in the end wall 13 and thence along the dwell 32 formed in the side wall 12, longitudinally of the belt sander 10, and intermediately of the upper and lower runs of the belt 18.

A cover member 34, shown in perspective in FIGURE 11, is secured within the housing, with the cover member 34 preferably being secured to the side wall 12 by means of screws 35 received in bosses 36 cast integrally within the side wall. The cover member 34 is preferably stamped from a suitable sheet metal, and has respective leg portions 37 and 38. The leg portion 37 of the cover member 34 is secured to the side wall 12, while the right-angularly bent leg portion 38 is cantilevered laterally therefrom and terminates in an inclined tip 39. This cantilevered leg 38 of the cover member 34, due to its initial stamping and bending, has a degree of inherent resiliency and tends to spring back towards the end wall 13 of the housing, so as to maintain the opening 30 substantially covered at all times. The legs 37 and 38 of the cover member 34 enclose the electrical leads 28 and 29 within the respective dwells 31 and 32, see FIGURE 6, and thereby prevent the leads from coming into contact with the belt 18, especially in the critical spaces where the leads are otherwise likely to come into contact with the belt.

With further reference to FIGURE 4, the continuations of the leads 28 and 29 beyond the cover member 34 are retained between the extension of the dwell 32 in the side wall 12 and the wall of the motor frame 20. As shown in FIGURES 7 and 9, the motor frame 20 has a pair of ribs 40 and 41 with spaced bosses 42 formed thereon. These bosses 42 communicate with bosses 43, see FIGURE 8, formed in the side wall 12 of the housing along its rib 33a. In such a manner the motor frame 20 is secured to the side wall 12 of the housing by screws (not shown) which pass through the corresponding bosses 42 and 43. The rib 41 on the wall of the motor frame 20 is alined with the rib 33a in the side wall 12 of the housing, see FIGURE 9, so as to retain the continuations of the leads 28 and 29 between the side wall 12 and the generally-cylindrical motor frame 20.

The motor frame 20, see FIGURES 7 and 10, has an opening 44 therein to receive the forwardmost ends of the leads 28 and 29, and the leads 28, 29 pass through the opening 44 and are received within the motor frame 20. At least one of the leads (and preferably both) terminate in the respective field coils 22a and 22b of the motor 19, as shown in FIGURE 10; and the opposite respective ends of the field coils 22a and 22b are connected by suitable leads 45 and 46 to the transverse brushes 23, preferably by means of respective garter-type springs 47. Preferably, but not necessarily, the brushes 23 are disposed in the forward portion of the motor frame 20.

Obviously, many modifications may be made without departing from the basic spirit of the present invention; and accordingly, within the scope of the appended claims, the invention may be practiced other than has been specifically described herein.

We claim:
1. In a belt sander having a housing formed with side and end wall portions, an end handle secured rearwardly of the end wall, a switch in the handle with an electrical line cord connected thereto, an endless belt within the housing to one side of the side wall and forwardly of the end wall of the housing, the belt having upper and lower runs, and a motor within the runs of the belt and drivingly connected to the belt; the improvement in electrical connection means, which comprises, in combination:
 (a) a pair of leads in the end handle, at least one of the leads being connected to the switch;
 (b) the end wall portion of the housing having an opening therein; and the leads projecting through said opening and running along the end wall portion towards the side wall portion of the housing, and thence along the side wall longitudinally of the belt sander and intermediately of the upper and lower runs of the belt, with said leads being connected to the motor which is within the belt; and
 (c) means confining said leads within the housing and protecting said leads from the belt;
 (d) said last-named means including a cover member secured to one of the wall portions of the housing and having a portion thereof overlying said opening in the end wall of the housing.
2. The improvement of claim 1, wherein:
 (a) said portion of said cover member overlying said opening in the end wall of the housing has a degree of inherent resiliency and tends to spring back towards the end wall of the housing to maintain the opening therein substantially covered, thereby preventing said leads from coming into contact with the belt.
3. The improvement of claim 1, wherein:
 (a) channel-shaped dwells are formed in the respective side and end wall portions of the housing, the dwell in the end wall of the housing communicating with said opening therein, the dwells communicating with one another, and the leads being received within the dwells; and wherein:
 (b) said cover member comprises a relatively-thin right-angularly bent member having respective leg portions, one of which covers the opening and the respective dwell in the end wall of the housing, and the other of which covers at least a portion of the respective dwell in the side wall of the housing.

4. The improvement of claim 3, wherein:
  (a) said respective dwell in the side wall of the housing is formed intermediately of the upper and lower runs of the belt; and wherein:
  (b) the remaining portion of said respective dwell, beyond said respective leg of said cover member, is substantially enclosed by the motor frame.

5. In a belt sander having a housing formed with a side wall, an end handle secured rearwardly of the housing, a switch in the handle with an electrical line cord connected thereto, an endless belt within the housing to one side of the side wall, the belt having upper and lower runs, and a motor in a frame within the runs of the belt, the motor frame being secured to the side wall, the motor being disposed along a longitudinal axis substantially parallel to the side wall and being drivingly connected to the belt, and the motor being of the universal type and including respective field coils and further including commutator-engaging brushes connected in series with the field coils, with the brushes being mounted transversely of the motor axis; the improvement in electrical connection means, which comprises, in combination:
  (a) a pair of leads in the end handle, at least one of the leads being connected to the switch;
  (b) said leads passing through the end handle and thence towards the side wall; and said leads running forwardly therefrom along the side wall, longitudinally of the belt sander, and intermediately of the upper and lower runs of the belt;
  (c) cover means secured to the side wall and enclosing said leads, with the forwardmost ends of said leads emerging from said cover means in the proximity of the brushes; and
  (d) the motor frame having an opening formed therein to receive said leads, with at least one of said leads being connected directly to one of the field coils of the motor.

6. In a belt sander having a housing formed with side and end wall portions, an end handle secured rearwardly of the end wall, a switch in the handle with an electrical line cord connected thereto, an endless belt within the housing to one side of the side wall and forwardly of the end wall, the belt having upper and lower runs, and a motor in a frame within the runs of the belt and drivingly connected to the belt, the improvement in electrical connection means, which comprises, in combination:
  (a) a pair of leads in the end handle, at least one of the leads being connected to the switch;
  (b) the end wall of the housing having an opening therein;
  (c) said leads projecting through said opening and thence towards the side wall; and said leads running forward therefrom along the side wall, longitudinally of the belt sander, and intermediately of the upper and lower runs of the belt;
  (d) means confining said leads within the housing and protecting said leads from the belt;
  (e) said last-named means comprising:
    (1) respective dwells formed in the side and end wall portions of the housing; and
    (2) a cover member secured to one of the wall portions of the housing; said cover member having respective portions enclosing said respective dwells in the housing wall portions; and
  (f) the motor frame having an opening formed therein to receive the forwardmost ends of said leads therethrough, with said leads being disposed within the motor frame and being connected to the motor.

References Cited

UNITED STATES PATENTS

| | | | |
|---|---|---|---|
| 2,178,865 | 11/1939 | Swan | 51—170 |
| 2,289,481 | 7/1942 | Burleigh | 51—170 |

LESTER M. SWINGLE, *Primary Examiner.*